United States Patent [19]
Trevino

[11] Patent Number: 6,007,404
[45] Date of Patent: Dec. 28, 1999

[54] JESUS DOLL FOR TEACHING CHILDREN

[76] Inventor: Daniel Trevino, 334 E. 28th St., Erie, Pa. 16504

[21] Appl. No.: 09/098,933

[22] Filed: Jun. 17, 1998

[51] Int. Cl.[6] .............................. A63H 3/28; A44C 23/00
[52] U.S. Cl. ................................ 446/297; 446/302; 428/3
[58] Field of Search .................................. 446/297, 299, 446/302, 303, 485; 428/3

[56] References Cited

U.S. PATENT DOCUMENTS

| | | | |
|---|---|---|---|
| 1,480,880 | 1/1924 | Brennan | 428/3 X |
| 1,794,109 | 2/1931 | Eckert | 428/3 X |
| 3,593,433 | 7/1971 | Dillon | 446/302 X |
| 4,525,821 | 7/1985 | Garcia | 428/3 X |
| 4,857,030 | 8/1989 | Rose | 446/303 |
| 4,878,871 | 11/1989 | Noto | 446/901 X |
| 4,923,428 | 5/1990 | Curran | 446/299 X |
| 5,184,971 | 2/1993 | Williams | 446/302 X |
| 5,279,514 | 1/1994 | Lacombe et al. | 446/297 |
| 5,376,038 | 12/1994 | Arad et al. | 446/302 X |
| 5,456,625 | 10/1995 | Dumond | 446/485 X |
| 5,607,336 | 3/1997 | Lebensfeld et al. | 446/302 X |
| 5,795,213 | 8/1998 | Goodwin | 446/297 |

*Primary Examiner*—D Neal Muir
*Attorney, Agent, or Firm*—Richard K. Thomson

[57] ABSTRACT

A soft-bodied doll bearing a resemblance to a caricature of Jesus. The doll includes a voice simulator which preferably has recorded thereon phrases from Jesus' actual ministry as recorded in God's word, the Bible. A responsible adult can use the Jesus doll to teach young children about Jesus' historic life, His ministry, His teachings and His love for His children. Alternatively, the voice simulator can have recorded thereon simpler phrases which reflect Jesus' character and love for His children. The doll includes an actuator for the voice simulator contained within a body portion of said doll which may be manually activated to speak one or more of these phrases. In one embodiment, both sets of phrases are included in the doll on separate voice simulators with a switch permitting the supervising adult to transition the doll from use with a young child to one who is capable of understanding Jesus' actual teachings when the child's vocabulary and mental faculties dictate.

6 Claims, 3 Drawing Sheets

JESUS DOLL FOR TEACHING CHILDREN

The present invention is directed to a doll in the form of a caricature of Jesus. More particularly, the present invention is directed to a talking Jesus doll for teaching young children about the life and teachings of Jesus who is the Christ.

BACKGROUND AND SUMMARY OF THE INVENTION

The concept of God taking on the form of a man is a difficult concept for most adults to understand. When trying to express the concept to a child, the task becomes even more difficult, particularly in today's culture where schools teach children they are an accident of nature, descended from apes rather than a unique child lovingly crafted by the hand of God in God's own image. The most important question a child will ever ask is "Who is Jesus?" because our individual response to that question determines where we will spend eternity. It is important then that parents, grandparents, teachers and concerned adults be equipped to answer the question in a way that helps the child understand that Jesus is real, relevant, and desires a relationship with that child.

It seems that dolls tend to become real persons in the minds of children. There is just something about being able to hold a cuddly caricature, to talk to her/him, to call her/him by name, spend time with her/him, etc., that makes even a make-believe character take on a personality in a child's mind. In addition, a doll can provide a sense of security and a source of comfort.

It is an object of the present invention to provide parents, grand-parents, Sunday school teachers and other responsible adults, a teaching tool that can be used to teach children from the earliest ages about the historic Jesus, His life and teachings, as well as His love for His children. These and other objects are accomplished by providing a flexible, soft doll bearing a resemblance of a caricature of Jesus; a voice simulator which speaks phrases. Preferably, these phrases comprise words spoken by Jesus during His earthly ministry (simplified for a child's vocabulary). Alternatively, the phrases may take the form of words that express the character of Jesus and His love for the child. The doll includes an actuator for the voice simulator contained within a body portion of said doll which may be manually activated to speak one or more of these phrases. The actuator may be concealed in Jesus' hand with a cross identifying the place to squeeze to effect voice activation. In one embodiment, both sets of phrases are included on separate voice simulators with a switch to enable the supervising adult to switch from one set of phrases to the other when s/he deems the child's vocabulary and mental faculties make such a transition appropriate.

Who better for a child to turn to for a sense of security than the One who holds the stars in place and who better for a child to turn to for comfort than the One who is called the Comforter? By providing a child with a Jesus doll, adults will be fostering a child's dependence on the only Person that can actually be counted on not to let them down and initiating a friendship with Christ that will last beyond the end of time.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
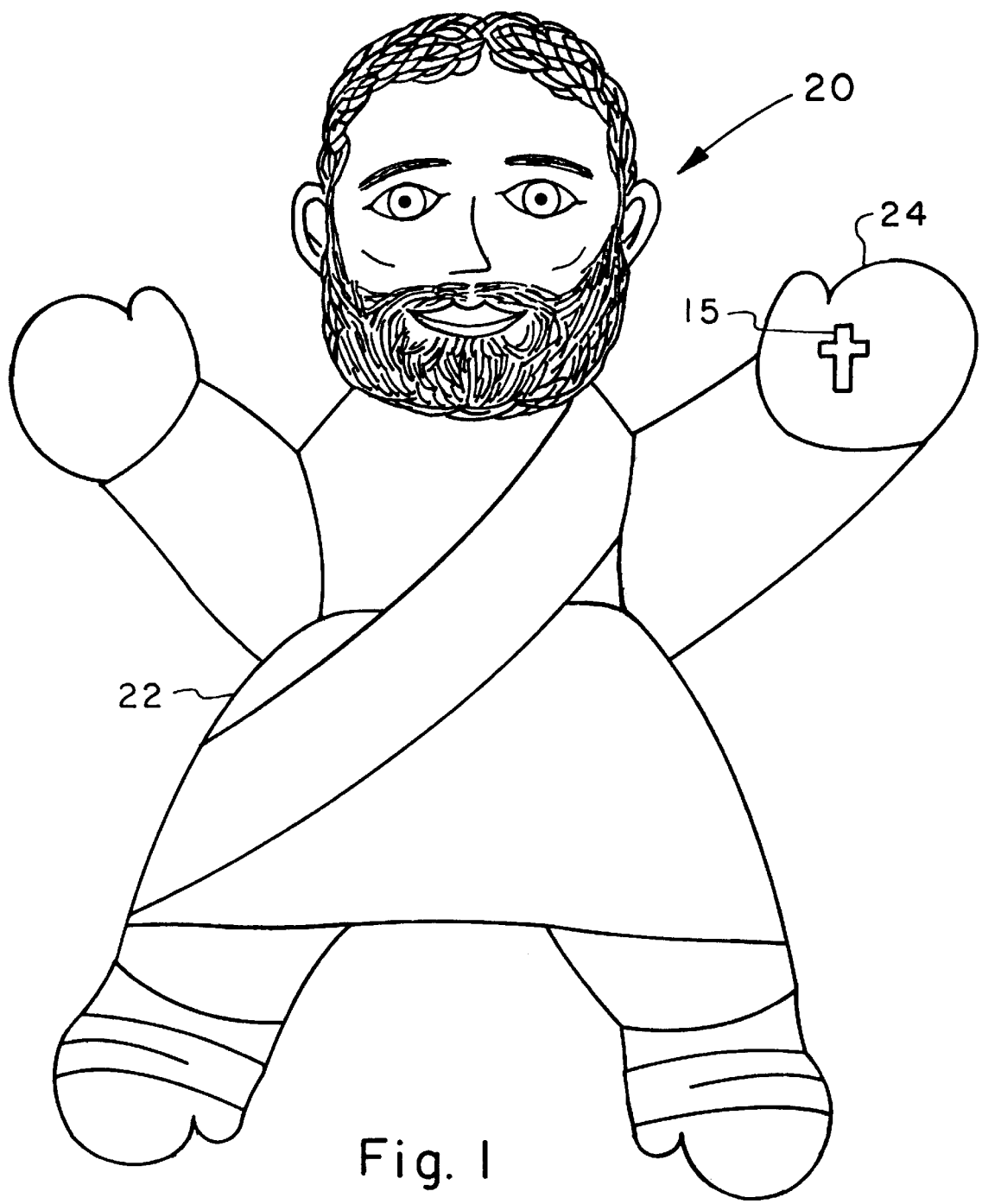
FIG. 1 is a front view of a first embodiment of the Jesus doll of the present invention.

The doll of the present invention is shown in FIG. 1 generally at 20. The doll is preferably a flexible, soft doll bearing a resemblance of a caricature of Jesus. The doll may be made of a washable fabric and stuffed with down or a foam material. The clothing and features of doll 20 will preferably be imprinted on the fabric. A voice simulator 30 is concealed within the body 22 of doll 20. A closeable actuator switch 36 is imbedded in the hand 24 of doll 20 with a cross 15 imprinted on the left hand 24 of the Jesus doll. When a child squeezes Jesus' hand 24 at cross 15, the doll's voice simulator 30 will speak one of the phrases recorded there. This squeezing of the hand symbolizes the child's embracing Jesus and His cross thereby receiving His words of comfort. While the words Jesus could speak are virtually limitless, it is preferred that the words be a simplified form of words actually spoken by Jesus for the purpose of facilitating teaching the child about the historic Jesus, His life and His teachings. Even so, a rather extensive list of phrases could be spoken. A preferred list of phrases and the related scriptural citation are listed in Table I as exemplary of phrases that could be used. Citations are listed in the order they appear in the Biblical text.

TABLE I

1. "Pray to your Heavenly Father." (Matt. 6:9)
2. "Forgive others so God will forgive you." (Matt. 6:14, 15)
3. "Put God first in your life and He will look after you." (Matt. 6:33)
4. "Ask God and He will give it to you." (Matt. 7:7)
5. "Treat others as you want to be treated." (Matt. 7:12)
6. "Honor your father and mother." (Matt. 19:19)
7. "Love God with all you are." (Matt. 22:37)
8. "Come, follow me." (Mark 1:17)
9. "To become a child of God, you must be born of the Holy Spirit." (John 3:5)
10. "If you believe in Me, you have eternal life." (John 6:40)
11. "I am the bread of life." (John 6:48)
12. "I am the door. Enter and be saved." (John 10:9)
13. "My sheep hear My voice and follow where I lead." (John 10:27)
14. "I and the Father are one." (John 10:30)
15. "I am the Son of God." (John 10:36)
16. "Where I am, you, as My servant, will be too." (John 12:26)
17. "Walk with Me in the light." (John 12:35)
18. "Don't be afraid. Trust in God and in Me." (John 14:1)
19. "I am the only way to Heaven." (John 14:6)
20. "I give you peace. Fear not." (John 14:27)
21. "Love each other as I have loved you." (John 15:12)

22. "No one loves you more than I do." (John 15:13)
23. "You are my friend if you obey Me." (John 15:14)
24. "I chose you as My friend." (John 15:16)
25. "I want you to be with Me in Heaven." (John 17:24)
26. "Peace be with you." (John 20:19)

Using the Jesus doll and these teachings of our Lord, a parent, grand-parent, teacher or other responsible adult, can teach a child not to be afraid. God loves them, has created them, and will care for their particular needs. Jesus has died for us that we might have life, a life that is pleasing to God, eternal in length and extraordinary in its quality. For those who receive Christ into their hearts as Lord of their lives, by faith, Jesus sends the Holy Spirit to produce a spiritual birth. We become new creatures, no longer self-centered and selfish but God-centered and selfless, living life to the fullest. Jesus has paid the penalty of Adam's original sin of defying God's authority so we could be restored to a right relationship to God. Jesus has not abandoned us but has, as He promised, come to live with us (in the form of the Holy Spirit), guiding us into all truth, comforting us in times of trouble, substituting His strength for our weakness.

Children can be encouraged to honor their parents, to obey them because by being obedient to their parents, they are obeying God (Jesus), a key indicator of our love for Him. In a culture where pluralism and tolerance are being extolled as ultimate virtues, children can be taught the truth: Christ is the only way to get to the Father. Only by trusting Him and living in obedience to His word can we find true happiness. Tolerating (without admonishing) a friend's unGodly lifestyle can be the ultimate unloving act.

While Table I presents phrases that are taken from Jesus' actual teachings, it is appreciated that the vocabulary and concepts may be beyond younger children (those under the age of 4). It is important that the Jesus doll of the present invention be used as early as possible in the child's development (beginning at 6 months) so that the child will develop a sense of the reality that Jesus is always there. Accordingly, a simpler list of phrases that express Jesus' character is shown in Table II which will be useful with children in the 6 mos. to 5 year old range. The list from Table I will be more appropriate for children, depending on the maturity of the particular child, in the 3 to 10 year old range.

TABLE II

1. "My name is Jesus. Let's be friends."
2. "I love you."
3. "Don't be afraid, I'm here."
4. "I love all boys and girls, especially you."
5. "Let's pray!"
6. "I will take care of you."
7. "I can do anything."
8. "Love Me with all your heart."
9. "I love all people."
10. "I am the way to heaven."
11. "I made all things."
12. "I will always be with you."
13. "Listen to your Dad and Mom."
14. "I tell you the truth."
15. "Maranatha!"
16. "Hush! Don't cry; I'm here."
17. "Love each other."
18. "I want to help you."
19. "I have a special plan for your life."
20. "Will you be My helper?"
21. "I am coming back soon."
22. "The Bible is My special book."
23. "I want to be your Savior."
24. "Let's play!"
25. "God bless you."
26. "Trust in the Lord with all your heart."

The phrases of Table II express the mind and heart of our Lord Jesus in a manner that will enable a child to begin to identify with Him at an early age. Several possibilities present themselves. First, a Jesus doll that speaks phrases from Table II, which could perhaps be smaller in size, made for younger children with a separate doll that speaks phrases from Table I provided for older children. As a first alternative, a single list could be provided taken from some or all of the phrases in Tables I and II. As a second alternative, phrases from Table I and phrases from Table II could be in the same doll with a switch allowing the responsible adult caring for the child to "graduate" the doll from using Table II phrases to Table I phrases when the adult recognizes that the child's vocabulary (typically between the ages of 3 and 5) has advanced sufficiently for such a transition to be meaningful.

Figure 2:
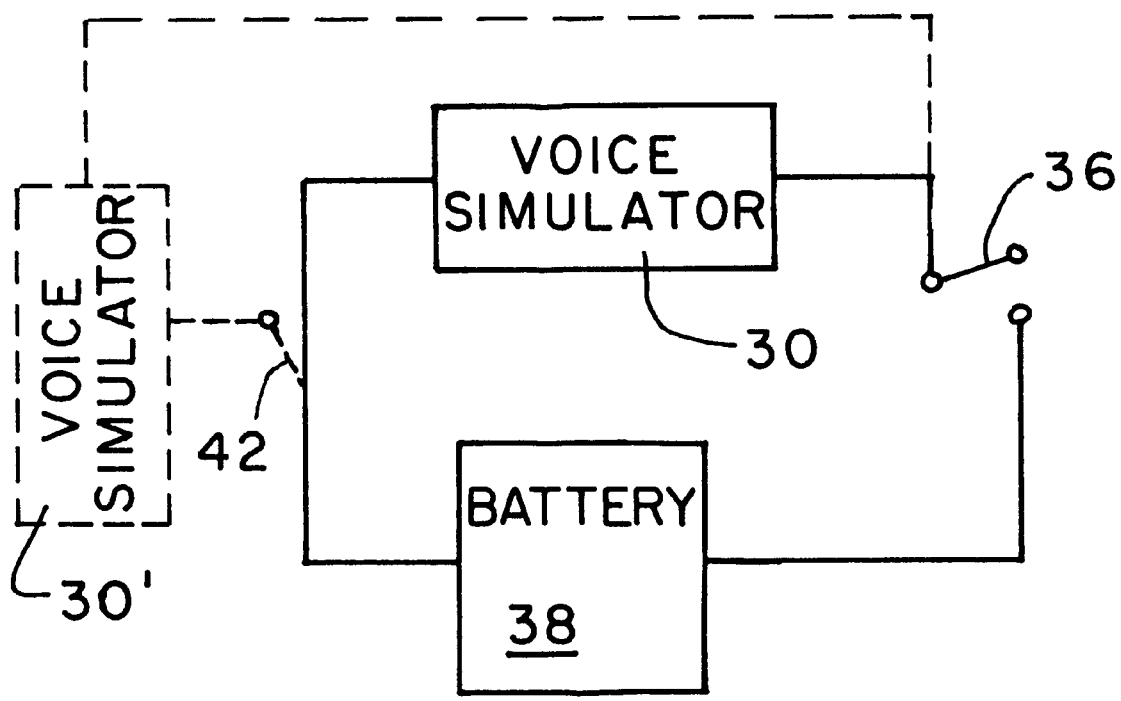
FIG. 2 is a schematic drawing of the electrical system for the doll.
Figure 3:
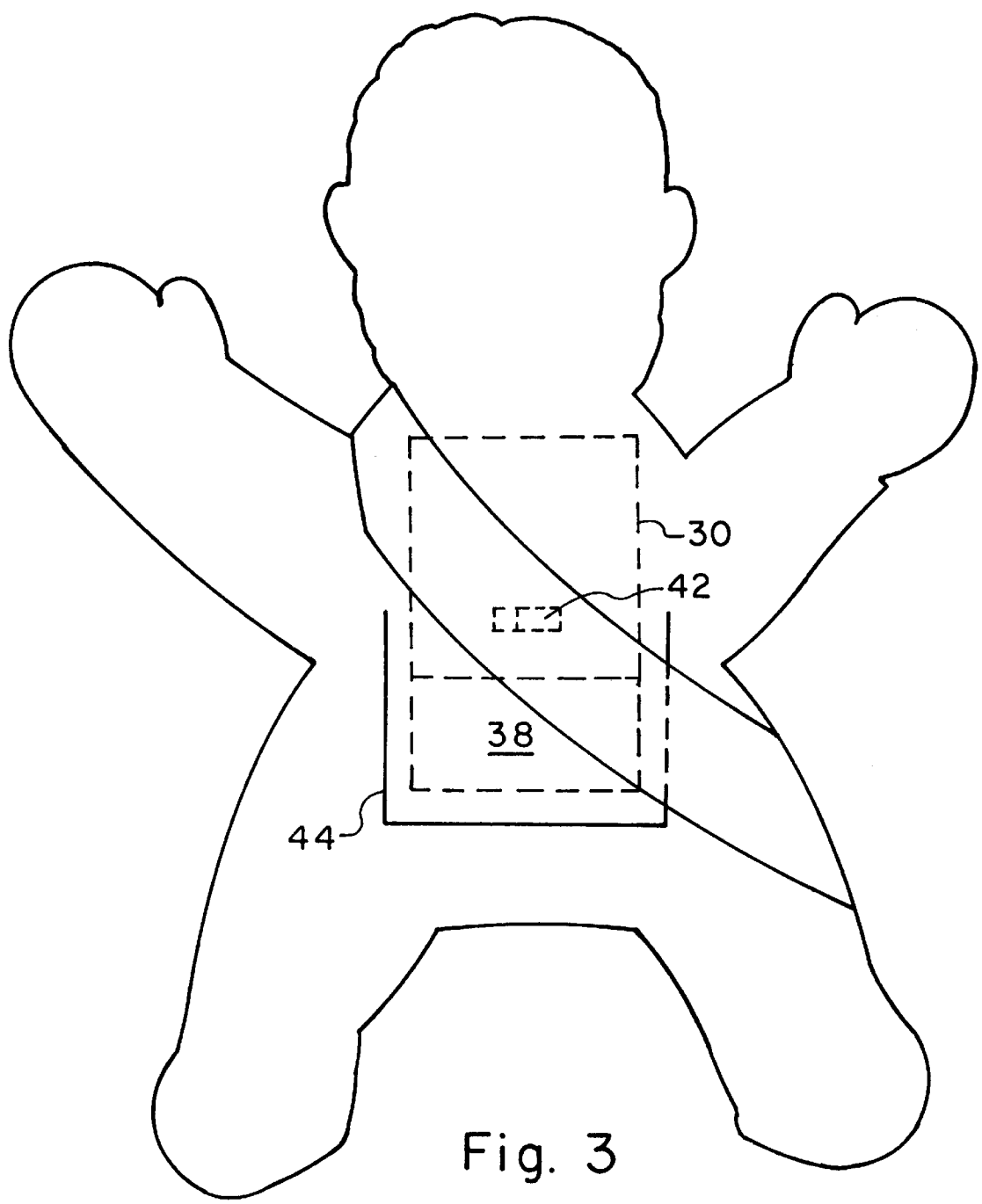
FIG. 3 is a back view of the first embodiment of the Jesus doll of the present invention.

FIG. 2 depicts a schematic electrical circuit for operation of the voice simulator 30 of the Jesus doll of the present invention. Embracing cross 15 closes actuator switch 36 allowing power from battery 38 to energize voice simulator 30. In its simplest form, voice simulator 30 will simply play the next phrase in the sequence which may include some or all of the phrases in Table I and/or II. In a more sophisticated simulator 30, the phrases may be imprinted on a memory chip that may randomly access any of the phrases on the chip, much as a random memory chip causes songs from a plurality of CDs to be accessed in a random sequence. Switch 36 will be spring biased to an open position and will return to that position after hand 24 has been squeezed and released. Opening of the circuit by opening switch 36 may be delayed until the completion of a particular phrase or, alternatively, voice simulator 30 may include a capacitor (not shown) that will be charged by the battery 38 with sufficient current to play the longest of the recorded phrases. As an option, a second voice simulator 30' can have the Table I phrases and switch 42 can be slid into position to energize simulator 30' instead of simulator 30 so that the vocabulary of Jesus doll 20 can graduate as the child's vocabulary warrants. Battery 38 and switch 42 can be concealed beneath a flap 44 (FIG. 3) which may be held down by Velcro® fasteners with flap 44 being lifted to move switch 42 or change battery 38.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A doll for teaching a child about the historical person and teachings of the Lord Jesus Christ, said doll comprising
   a) a flexible, soft-bodied doll bearing a resemblance to a caricature of Jesus;
   b) a first voice simulator within a body portion of said doll with a plurality of phrases contained thereon which communicate the character of Jesus;
   c) a battery contained within said doll;
   d) a first switch on a portion of said doll;

e) a second separate voice simulator having a second set of phrases and a second switch movable between a first and second position for selecting one of said simulators with its respective set of phrases;

whereby, when said first switch is activated, said battery energizes said voice simulator to randomly play one of said phrases to familiarize the child with the character and teachings of the historical Christ.

2. The doll of claim 1 wherein said first switch is embedded in a hand portion of said doll and a cross is drawn on said hand portion, emblematic of where said doll must be squeezed in order to make it speak.

3. The doll of claim 1 wherein said phrases are simplified phrases of Jesus' actual teachings during His earthly ministry.

4. The doll of claim 3 wherein said phrases are at least two of the phrases set forth in Table 1.

5. The doll of claim 1 wherein said phrases are at least two of the phrases set forth in Table II.

6. The doll of claim 1 wherein said phrases are at least two of the phrases set forth in Tables I and II.

* * * * *